United States Patent
Ohki (10) Patent No.: US 10,864,927 B2
(45) Date of Patent: Dec. 15, 2020

(54) MONITORING SYSTEM AND MONITORING METHOD (71) Applicant: HITACHI KOKUSAI ELECTRIC INC., Tokyo (JP)

(72) Inventor: Kana Ohki, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 0 days.

(21) Appl. No.: 16/493,371

(22) PCT Filed: Mar. 7, 2018

(86) PCT No.: PCT/JP2018/008791
§ 371 (c)(1),
(2) Date: Sep. 12, 2019

(87) PCT Pub. No.: WO2018/180311
PCT Pub. Date: Oct. 4, 2018

(65) Prior Publication Data
US 2020/0031373 A1  Jan. 30, 2020

(30) Foreign Application Priority Data
Mar. 28, 2017 (JP) .................. 2017-062943

(51) Int. Cl.
*H04N 7/18* (2006.01)
*B61K 13/04* (2006.01)
(Continued)

(52) U.S. Cl.
CPC ............. *B61K 13/04* (2013.01); *B61B 1/02* (2013.01); *H04N 5/23218* (2018.08); *H04N 7/183* (2013.01)

(58) Field of Classification Search
CPC ...... H04N 5/23218; H04N 7/182; H04N 7/18; B61K 13/04; B16B 1/02
(Continued)

(56) References Cited

U.S. PATENT DOCUMENTS

2003/0218542 A1* 11/2003 Barendt ........... G08B 13/19645
340/545.1
2009/0093384 A1* 4/2009 Ward ................... C10M 167/00
508/205
(Continued)

FOREIGN PATENT DOCUMENTS

JP  2003-252201  9/2003
JP  2005-349997  12/2005
(Continued)

OTHER PUBLICATIONS

International Search Report dated May 29, 2018 for International Application No. PCT/JP2018/008791 filed Mar. 7, 2018.
European search report dated Aug. 7, 2020 in corresponding European Patent Application No. 18 774 806.6.

*Primary Examiner* — Michael Lee
(74) *Attorney, Agent, or Firm* — Cooper & Dunham LLP (57) ABSTRACT

Provided is a technology for monitoring train doors which improves the accuracy of detection of trapping in vehicle doors. A server compares the difference between a static image (reference image 91), from each monitoring camera, of a normal state in which there is no trapping in vehicle doors, said static images being held in the server in advance, and a static image (an observation image 92) first acquired in a prescribed acquisition time. If a difference is present, the difference (difference image 94) between the reference image 91 and the observation image 92 acquired in the acquisition time is acquired. A quadrilateral F which covers the four sides of an object constituting the difference is subsequently rendered, the centre point of the quadrilateral is obtained, it is determined that trapping has occurred if (Continued)

movement of a centre coordinate C1, C2, ... Cn, i.e. the difference between the centre coordinates C, is lower than a prescribed threshold value, and red frame rendering of video is indicated on a monitor.

3 Claims, 10 Drawing Sheets

(51) Int. Cl.
   *H04N 5/232* (2006.01)
   *B61B 1/02* (2006.01)
(58) Field of Classification Search
   USPC .......................................................... 348/148
   See application file for complete search history.

(56) References Cited

U.S. PATENT DOCUMENTS

| | | | |
|---|---|---|---|
| 2017/0050652 A1* | 2/2017 | Beyer | B61L 15/0081 |
| 2019/0003232 A1* | 1/2019 | Kobayashi | E05F 15/43 |

FOREIGN PATENT DOCUMENTS

| | | | |
|---|---|---|---|
| JP | 2009121144 A | * | 6/2009 |
| JP | 2009-279970 | | 12/2009 |
| JP | 2011240846 A | * | 12/2011 |
| JP | 2014-084064 | | 5/2014 |
| JP | 2014-148300 | | 8/2014 |
| JP | 2014-184803 | | 10/2014 |
| JP | 5748468 | | 5/2015 |

* cited by examiner

MONITORING SYSTEM AND MONITORING METHOD

TECHNICAL FIELD

The present invention relates to a monitoring system and a monitoring method, for example, to a system and a method for monitoring doors of a railway vehicle.

BACKGROUND ART

In railway monitoring, from the viewpoint of securing safety at the station platform (hereinafter, referred to as "platform") as well as inside/outside of each vehicle, a system using monitoring cameras is known (see, for example, Patent Literatures 1 and 2). Also, in recent years, a railway monitoring system requires a vehicle door trapping detection technique for confirming whether there is any abnormality, such as trapping of a person or foreign body, in the vehicle doors when stopping at the platform and opening/closing vehicle doors, in addition to the monitoring of the inside/outside of the vehicle and the platform.

As a main trapping detection method, a method for detecting the trapping of a person or foreign body in a vehicle door with a physical sensor using pressure or infrared rays has been mainly used.

However, recently, when a thin component, such as a front wheel of a stroller is trapped, there are cases where the physical sensor does not work for detection of such a trapping and, as a result, a train start running as it is. For this reason, there is an increasing demand for a trapping detection technique using image processing determination of monitoring videos, in place of or in combination with physical sensors.

Further, when the trapping is not normally detected and the train starts running in a state where a person or an object is trapped, a person who confirms this situation on the platform can press an emergency stop button to enable a crew member to receive a notification and perform an emergency operation for stopping the train. In this regard, even when the emergency stop button is pressed, the crew member may fail in judging the priority if the crew experience is insufficient and continue to let the train travel.

CITATION LIST

Patent Literature

PATENT LITERATURE 1: JP-A-2014-184803
PATENT LITERATURE 2: Japanese Patent No. 5748468

SUMMARY OF INVENTION

Technical Problem

As mentioned above, the vehicle door trapping detection using physical sensors mainly used presently is limited in size of a detection target. That is, there is a possibility that a thin or slim object may not be detected. Further, although a crew member takes stop measures for the train already started traveling in case of a false detection (non-detection) with respect to the trapping detection, there is also a possibility that human error may occur. From these points of view, there has been a demand for a technique capable of performing safety confirmation in the vicinity of vehicle doors by monitoring with monitoring cameras and using image processing determination.

The present invention has been made in view of such circumstances and intends to solve the above-mentioned problem.

Solution to Problem

The present invention is a monitoring system including a monitoring camera that images a door of a train and a control device that detects trapping by the door based on a video obtained by the monitoring camera, wherein when the door has changed from an opened state to a closed state, the control device determines that trapping by the door has occurred based on a difference image between a reference image captured by the monitoring camera and an observation image captured by the monitoring camera after elapse of a prescribed time since the capturing of the reference image.

The monitoring camera may capture a plurality of observation images after capturing the reference image, and the control device may acquire a difference image between the reference image and each observation image, obtain the movement of a central coordinate from central coordinates of the plurality of difference images, and determine that trapping by the door has occurred if it is determined that the central coordinate has not moved.

The present invention is a monitoring method for detecting trapping by a door based on a video of a monitoring camera that images the door of a train, including a difference calculation step of calculating a difference between a reference image captured by the monitoring camera and an observation image captured by the monitoring camera after elapse of a prescribed time since the capturing of the reference image, when the door has changed from an opened state to a closed state, and a trapping determination step of determining that trapping by the door has occurred based on the difference.

The trapping determination step may include obtaining the movement of a central coordinate of the difference calculated in the difference calculation step, and determining that trapping by the door has occurred if it is determined that the central coordinate has not moved.

Advantageous Effects of Invention

According to the present invention, by using trapping detection using image processing determination of monitoring videos in place of or in combination with the detection by physical sensors, more accurate trapping detection can be performed regardless of the type of object trapped. Further, from another viewpoint, a technique capable of realizing easier and more reliable monitoring can be provided by enabling a crew member to confirm the situation of the platform while viewing the video on a monitor installed in a crew room, in addition to the trapping detection method using the physical sensors and the image processing determination of monitoring videos, and by calling attention of the crew member with ringing of alarm in response to the detection of trapping.

DESCRIPTION OF EMBODIMENTS

Next, the modes for carrying out the present invention (hereinafter, simply referred to as "embodiments") will be specifically described with reference to the drawings. The outline of the present embodiment is as follows. (1) The image processing is performed based on videos of monitoring cameras that monitor vehicle doors, and it is discriminated whether an object located near the vehicle door is only passing near or is trapped by the vehicle door. (2) Videos of the monitoring cameras are allocated to a monitor installed in a crew room for monitoring, at prescribed timing, for example, when a train stops at the platform and the doors are opened. (3) When the vehicle doors are closed, trapping detection is performed based on image processing, and if trapping occurs, a corresponding video on the monitor is displayed in a display mode that draws attention easily, such as a display in a red frame, and further processing for ringing alarm sounds is performed.

The following effects can be obtained by these. (1) Using the image processing determination of monitoring videos in place of or in combination with physical sensors in the trapping detection of the vehicle doors can improve the availability and reliability of the monitoring system. (2) Automatically allocating monitoring videos of the vehicle doors on the monitor enables a crew member to confirm the situation while viewing the videos of the vehicle doors and can improve the convenience of the monitoring system. (3) In case of detection of trapping in a state where the monitoring videos of the vehicle doors are allocated to the monitor, displaying the corresponding video on the monitor in the display mode that draws attention easily and ringing alarm sounds can call attention to the crew member and can improve work efficiency, monitoring easiness, and reliability.

Figure 1:
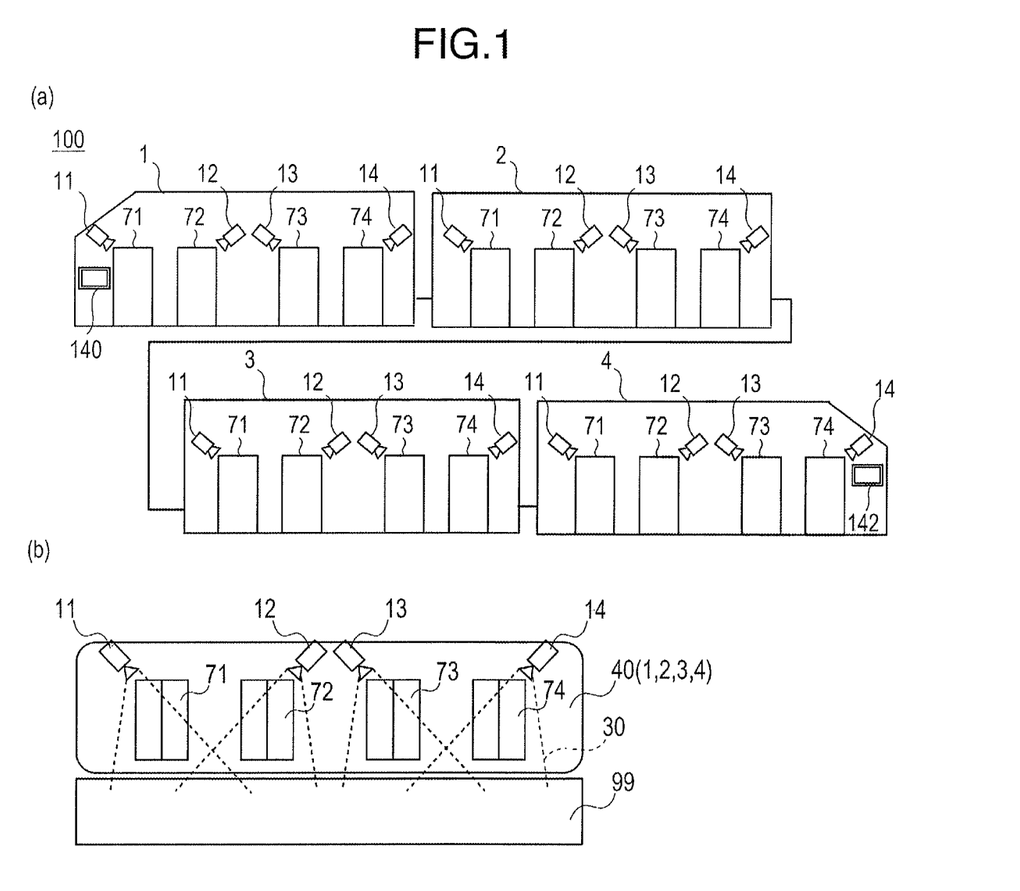
FIG. 1 is a diagram schematically illustrating the outline of an exemplary arrangement of a train monitoring camera system according to an exemplary embodiment.

FIG. 1 schematically illustrates the outline of an exemplary arrangement of a monitoring camera system 100 for a railway mounted on a one-formation train, in which the monitoring camera system 100 monitors the vicinity of each entrance (each vehicle door) from within the train. FIG. 1(a) illustrates a schematic arrangement of a 4-vehicle formation train having first to fourth vehicles 1 to 4 and various devices mounted therein. FIG. 1(b) illustrates the relationship between first to fourth monitoring cameras 11 and first to fourth vehicle doors 71 to 74 to be imaged by them in one vehicle 40.

Figure 2:
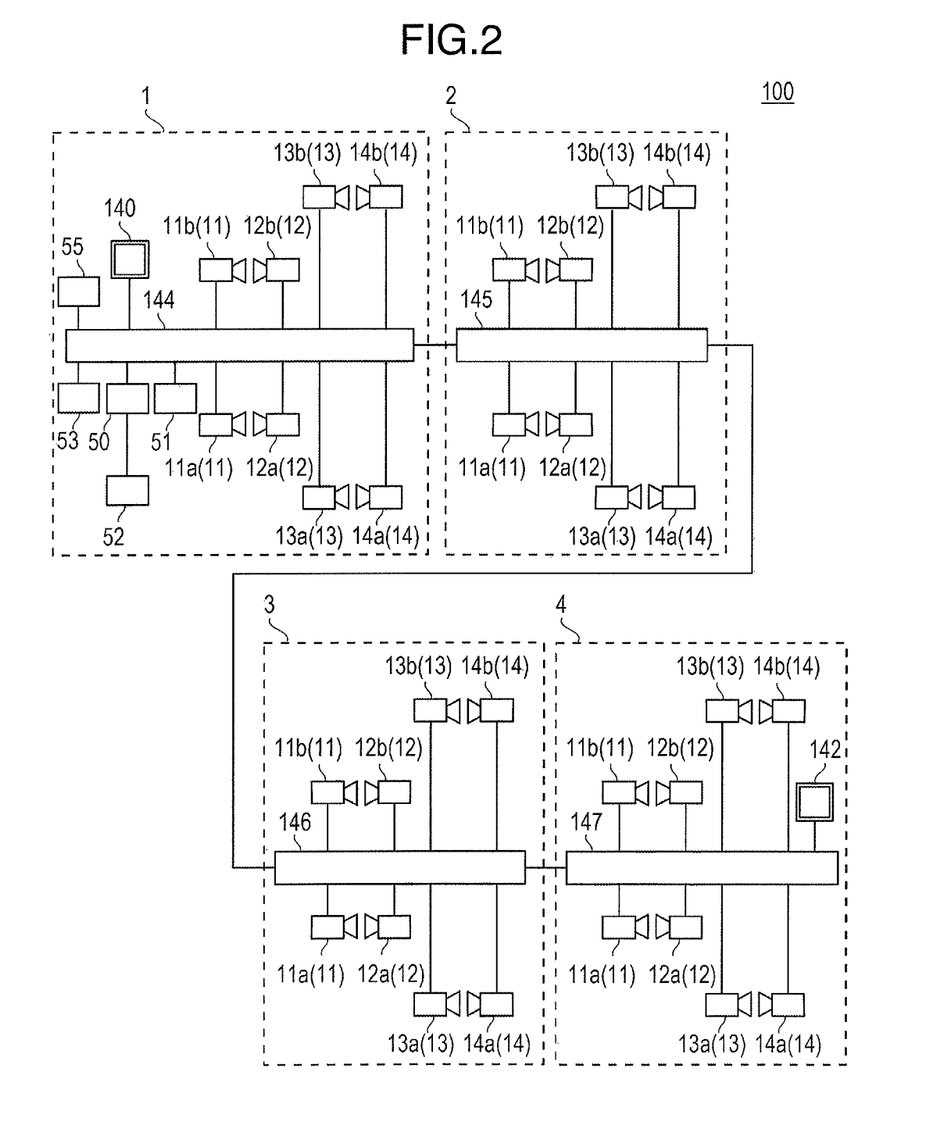
FIG. 2 is a diagram for mainly explaining the connection of respective devices configuring the monitoring camera system according to an exemplary embodiment.

FIG. 2 is a block diagram for explaining an exemplary configuration of the monitoring camera system 100. FIG. 1 is a diagram for mainly explaining installation and arrangement of the monitoring camera system 100 in the train, while FIG. 2 is a diagram for mainly explaining connection of respective devices configuring the monitoring camera system 100. In FIG. 2, respective frames indicated by broken lines represent the first to fourth vehicles 1 to 4 illustrated in FIG. 1(a), and all the devices configuring the monitoring camera system 100 are connected, for example, by a network cable in the case of wired connection.

As illustrated in FIG. 1(a), the train is a 4-vehicle formation train consisting of a first vehicle 1 at the head, second and third vehicles 2 and 3 in the middle, and a fourth vehicle 4 at the tail, and the monitoring camera system 100 for a railway is installed in the vehicles of the train. In this embodiment, the travelling direction of the train will be described as a direction in which the train advances with the first vehicle 1 as the leading vehicle.

Each vehicle (each of the first to fourth vehicles 1 to 4) is a vehicle having four doors on one side (eight doors on both sides). The first vehicle door 71, the second vehicle door 72, the third vehicle door 73, and the fourth vehicle door 74 are successively provided on one side of each vehicle (for example, on the left side with respect to the travelling direction), from the travelling direction side. The first vehicle door 71, the second vehicle door 72, the third vehicle door 73, and the fourth vehicle door 74 are also provided on the other side (for example, on the right side with respect to the travelling direction), from the travelling direction side.

Passengers get on and off the vehicle from the doors on either the left side or the right sides or both sides, which open to a platform 99.

For monitoring passengers, first to fourth monitoring cameras 11 to 14 are attached to the first to fourth vehicle doors 71 to 74 respectively. The first to fourth monitoring cameras 11 to 14 are, for example, IP cameras attached at prescribed positions on the outer side (side surface) of the vehicle. FIG. 1 illustrates only the left side doors and the monitoring cameras relating to the left side doors, of the passenger doors on the right and left sides of the vehicle, and does not illustrate the doors on the opposite side (right side) and the monitoring cameras relating to these doors. The configurations other than the monitoring cameras are common regardless of the right and left doors.

The leading first vehicle 1 is provided with a monitor PC 140 for monitoring, and the trailing fourth vehicle 4 is provided with a monitor PC 142 for monitoring. The monitor PCs 140 and 142 may be configured in the plural.

A driver can confirm videos captured by all the first to fourth monitoring cameras 11 to 14 on the monitor PCs 140 and 142. The videos of the monitoring cameras of one vehicle may by displayed in a display area that is, for example, divided into a plurality of areas, so that the videos can be sequentially switched to videos of the monitoring cameras of another vehicle.

Similar to FIG. 1, FIG. 2 illustrates only the left side doors and monitoring cameras relating to these doors on one side, of the passenger doors on the right and left sides of the vehicle, and does not illustrate the doors on the opposite side and the monitoring cameras relating to these doors. The remaining configurations are common regardless of the right and left doors.

As illustrated in FIG. 1 or FIG. 2, the monitoring system 100 is installed on the train consisting of the first to fourth vehicles 1 to 4 connected to each other. The monitoring camera system 100 includes the first to fourth monitoring cameras 11 to 14, the monitor PCs 140 and 142, L2-SWs (layer 2 switches) 144 to 147, a server 50 (a control device), a recording device 51, a host server 52, an alarm device 53, and an emergency stop device 55. A power supply cable (not illustrated) supplies electric power to respective devices from a power supply unit (not illustrated) of the first to fourth vehicles 1 to 4.

The server 50, the recording device 51, the host server 52, the alarm device 53, the emergency stop device 55, the first to fourth monitoring cameras 11 to 14 (11*a* to 14*a* and 11 *b* to 14*b*), the monitor PCs 140 and 1421, and the L2-SW 144 are installed on the leading first vehicle 1.

The server 50, the recording device 51, the monitor PCs 140 and 142, the alarm device 53, the emergency stop device 55, and the first to fourth monitoring cameras 11 to 14 are connected to the L2-SW 144, respectively. The host server 52 is connected to the server 50. Further, the L2-SW 144 is connected to the L2-SW 145 installed on a following second vehicle 2.

The first to fourth monitoring cameras 11 to 14 (11*a* to 14*a* and 11 *b* to 14*b*), the monitor PC 142, the alarm device 53, the emergency stop device 55, and the L2-SW 147 are installed on the trailing fourth vehicle 4. The first to fourth monitoring cameras 11 to 14, the alarm device 53, the emergency stop device 55, and the monitor PC 142 are connected to the L2-SW 147, respectively. Further, the L2-SW 147 is connected to the L2-SW 146 installed on a preceding third vehicle 3.

The host server 52 is, for example, a device for managing the operation of the train, such as, TMS (Train Management System). During the train operation, the host server 52 outputs operational information of the train to the server 50 at prescribed intervals. The operational information of the train includes, at least, train speed information, passenger door open/close information (information on whether the passenger door is opened or closed), information on entrance at the platform of the next stopping station or the current stopping station (for example, information indicating whether the left side doors are at the entrance side or the right side doors are at the entrance side), and the number of vehicles.

The first to fourth monitoring cameras 11 to 14 (11*a* to 14*a* and 11 *b* to 14*b*) and the L2-SW 145 are installed on the intermediate second vehicle 2. The L2-SW 145 is connected to the L2-SW 144 installed on the preceding first vehicle 1, and the L2-SW 146 installed on the following third vehicle 3, respectively, via a network cable. Similar to the second vehicle 2, the first to fourth monitoring cameras 11 to 14 (11*a* to 14*a* and 11 *b* to 14*b*) and the L2-SW 146 are installed on the third vehicle 3. The L2-SW 146 is connected to the L2-SW 145 installed on the preceding second vehicle 2, and the L2-SW 147 installed on the following fourth vehicle 4, respectively, via a network cable.

In this manner, between the leading first vehicle 1 and the intermediate second vehicle 2, between the intermediate second vehicle 2 and the third vehicle 3, and between the intermediate third vehicle 3 and the trailing fourth vehicle 4, connecting the L2-SWs installed on neighboring vehicles via network cables can constitute a single network in the train.

In the monitoring camera system 100 illustrated in FIGS. 1 and 2, a driver (a crew member) can get on the leading first vehicle 1 to perform operations of the train (including driving, opening/closing of the entrance) by one person. When it is determined from the videos of the first to fourth monitoring camera 11 that the train should be stopped, the driver or the like can operate the emergency stop device 55 to stop the train urgently. In addition, the alarm device 53 generates an alarm informing an emergency.

Each of the first to fourth monitoring cameras 11 to 14 (11*a* to 14*a* and 11 *b* to 14*b*) captures images with a prescribed field of view at a prescribed imaging frame rate. Then, the first to fourth monitoring cameras 11 to 14 compress the captured videos (live videos) in a format such as H.264/MPEG4/JPEG, and transmit them via the L2-SW and the network cable to the recording device 51 and the monitor PCs 140 and 142.

The recording device 51 constantly records the input video in association with the monitoring camera and imaging time thereof. The monitor PCs 140 and 142 display, on their screens, live videos and recording videos of all the first to fourth monitoring cameras 11 to 14 according to an instruction from the server 50, by performing video processing, such as expansion and clipping.

The recording videos are mainly used as analysis materials or evidence videos in case of emergency, such as occurrence of an accident or a crime. An operator performs main settings of the server 50, the monitor PCs 140 and 142, the first to fourth monitoring cameras 11 to 14 (11*a* to 14*a* and 11*b* to 14*b*), and the recording device 51, in advance, at the time of starting a system operation.

The first to fourth monitoring cameras 11 to 14 (11*a* to 14*a* and 11*b* to 14*b*) transmit videos to the recording device 51 and the monitor PCs 140 and 142 at prescribed transmission frame rates thereof. Alternatively, the first to fourth monitoring cameras 11 to 14 (11*a* to 14*a* and 11*b* to 14*b*) transmit videos to the recording device 51 and the monitor PCs 140 and 142 in response to transmission requests transmitted from the monitor PCs 140 and 142 via the L2-SWs, at prescribed transmission frame rates thereof.

Whether to automatically transmit the videos of the first to fourth monitoring cameras 11 to 14 (11*a* to 14*a* and 11*b* to 14*b*) by the monitoring cameras at the prescribed frame rates thereof or transmit according to the transmission requests from the monitor PCs 140 and 142 can be set, in advance, by the operator at the time of starting the system operation. Further, the driver can operate the server 50 to switch.

The server 50 can control field angles and imaging directions of the first to fourth monitoring cameras 11 to 14 (11*a* to 14*a* and 11*b* to 14*b*). Further, the server 50 performs image processing on acquired videos to determine whether a warning event has occurred in a monitoring target area. For example, the warning event assumes a state where any object (such as an arm of a person, a bag, an umbrella, or a wheel of a stroller) is trapped by the first to fourth vehicle doors 71 to 74. In addition to the image processing, it is also preferable to use detection results of physical sensors (infrared sensors or pressure sensors) provided at the first to fourth vehicle doors 71 to 74 for the determination of the warning event. Combining them can enhance the detection accuracy.

Hereinafter, an operation mode by the first to fourth monitoring cameras 11 to 14 will be described with reference to FIG. 1(*b*), which illustrates one vehicle 40 (4-door configuration) stopped at the platform 99. The first monitoring camera 11 is attached to the upper front side of the first vehicle door 71 and has an imaging direction set toward the lower rear side. The second monitoring camera 12 is attached to the upper rear side of the second vehicle door 72 and has an imaging direction set toward the lower front side. The third monitoring camera 13 is attached to the upper front side of the third vehicle door 73 and has an imaging direction set toward the lower rear side. The fourth monitoring camera 14 is attached to the upper rear side of the fourth vehicle door 74 and has an imaging direction set toward the lower front side.

The first to fourth monitoring cameras 11 to 14 monitor the first to fourth vehicle doors 71 to 74, respectively. It is assumed that the first vehicle door 71 and the second vehicle door 72 are a combination to be paired and the third vehicle door 73 and the fourth vehicle door 74 are a combination to be paired.

Figure 3:
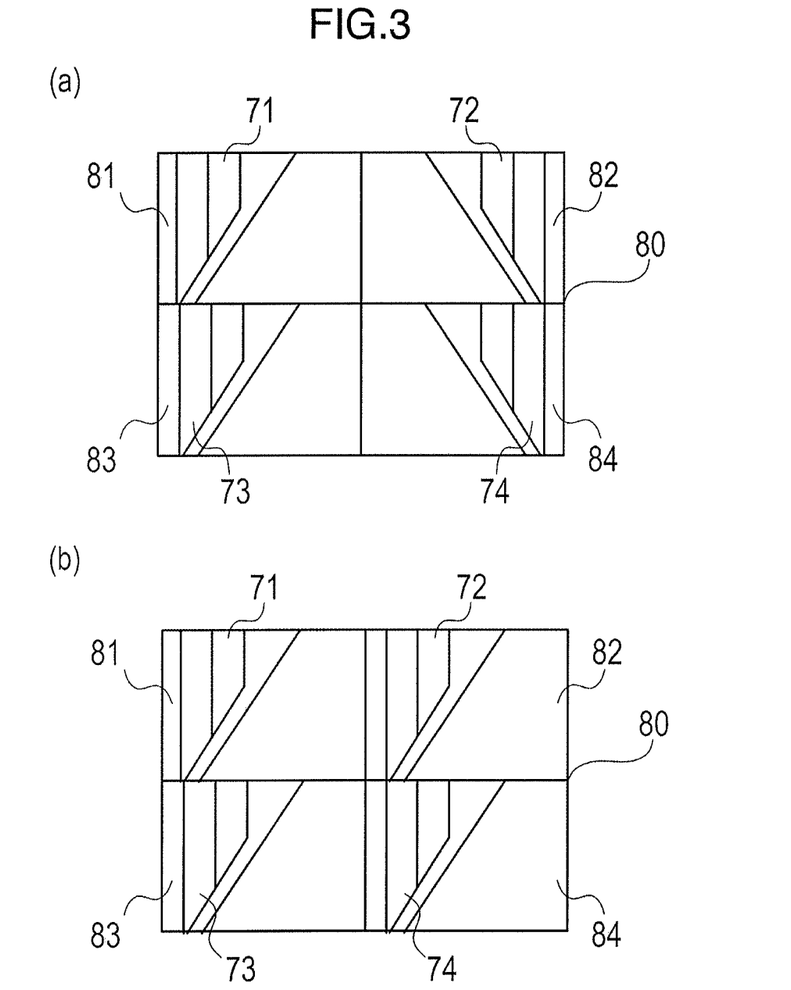
FIG. 3 is a diagram illustrating an exemplary display of videos obtained by first to fourth monitoring cameras on a monitor, according to an exemplary embodiment.

FIG. 3 illustrates examples of the display by a monitor 80 in which the videos of the first to fourth vehicle doors 71 to 74 are allocated into 4-divided sections 81-84, respectively, of a display screen. FIG. 3(*a*) is an exemplary display in which the directions of the videos (monitoring directions) are not adjusted, and FIG. 3(*b*) is an exemplary display in which the directions of the videos are unified for all the cameras. The video allocation to the monitor 80 is performed in a duration from opening of respective vehicle doors (the first to fourth vehicle doors 71 to 74) to normal closing without any trapping by all vehicle doors.

In the monitor 80 of the illustrated embodiment, the maximum number of videos displayable on one monitor 80 is four corresponding to one vehicle. A page feed function may be added to a monitor screen so that videos of a plurality of vehicles can be displayed.

Figure 4:
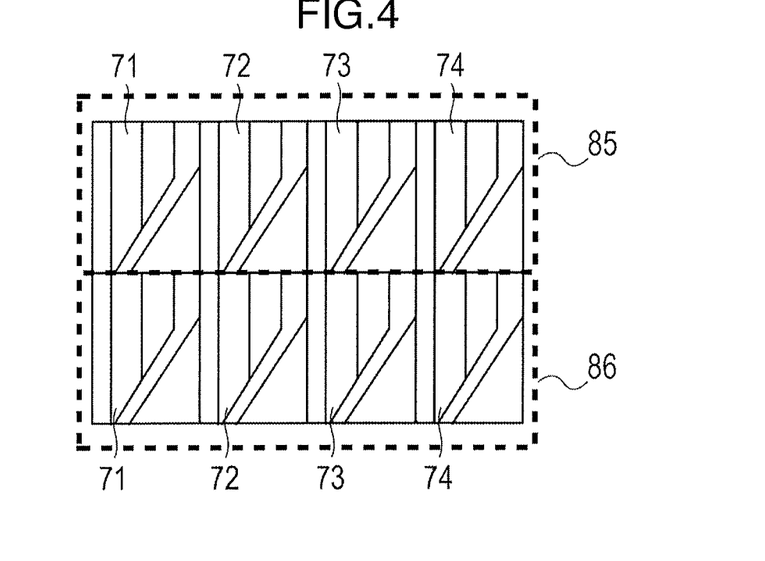
FIG. 4 is a diagram illustrating an example in which the display of respective videos of the first to fourth monitoring cameras of two vehicles on monitor are unified in monitoring direction, according to an exemplary embodiment.

Further, as illustrated in FIG. 4, the monitor 80 may clip minimum necessary video regions and display eight or more videos of two vehicles on the screen of one monitor. For example, an upper stage 85 is allocated to monitoring videos of the first vehicle 1 and a lower stage 86 is allocated to monitoring videos of the second vehicle 2.

Subsequently, the trapping determination processing at the time of closing the vehicle doors (the first to fourth vehicle doors 71 to 74) will be described. After getting on-and-off of passengers has completed, a crew member 98 closes the vehicle doors (the first to fourth vehicle doors 71 to 74). At this time, the server 50 receives the instruction to close the vehicle doors (the first to fourth vehicle doors 71 to 74), and starts static image acquisition from the monitoring videos of respective vehicle doors (the first to fourth vehicle doors 71 to 74) at regular periods.

The static image acquisition may be performed by extracting image frames configuring the videos, which are moving images, at prescribed timing (for example, every 0.5 second). In this case, static images are acquired only for a certain period of time after starting the acquisition.

Figure 5:
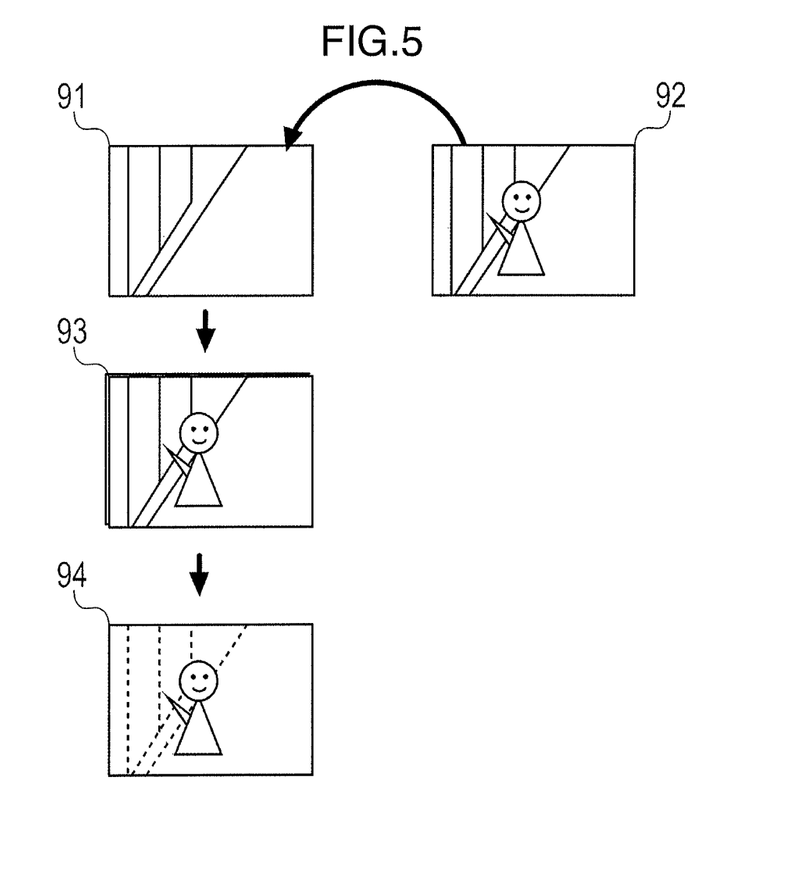
FIG. 5 is a diagram illustrating a difference acquisition procedure at the time of trapping determination processing, according to an exemplary embodiment.

Next, the trapping determination processing will be described in detail. In the trapping determination processing, determination is performed based on difference images of the monitoring target area. FIG. 5 is a diagram illustrating a difference acquisition procedure at the time of the trapping determination processing.

Hereinafter, an exemplary case in which it is determined whether a human hand is trapped by the first vehicle door 71 monitored by the first monitoring camera 11 will be described. Similar processing is performed for other monitoring cameras (the second to fourth monitoring cameras 12 to 14). The server 50 stores a static image (hereinafter, referred to as "reference image 91") of the first vehicle door 71 captured by the first monitoring camera 11 when the first vehicle door has been closed normally without causing any trapping. Further, an image captured during the trapping determination processing is referred to as "observation image 92".

In order to perform the trapping determination processing, a difference (a difference image 94) is acquired by overlapping the observation image 92 of the first vehicle door 71 initially acquired after closure of the first vehicle door 71 with the reference image 91. If there is no difference, it is determined that "there is no trapping". A general technique can be used in the image processing for acquiring the difference.

Figure 6:
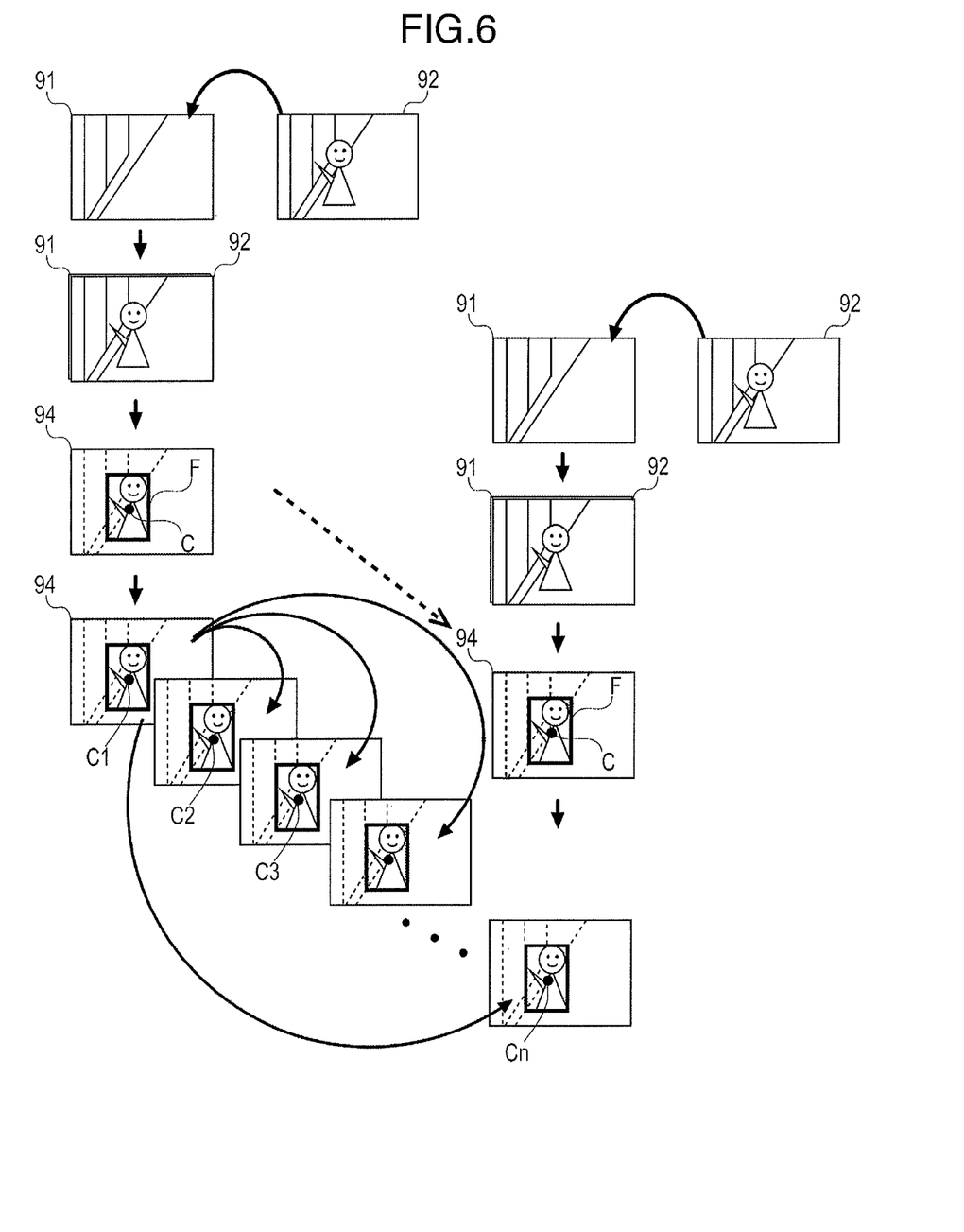
FIG. 6 is a diagram illustrating an observation procedure of motion detection of the difference in the trapping determination processing, according to an exemplary embodiment.

FIG. 6 is a diagram illustrating an observation procedure of motion detection of the difference in the trapping determination processing. At this time, if the difference can be acquired through the procedure illustrated in FIG. 5, then a normal static image is successively compared with each static image of the first vehicle door 71 periodically acquired and the movement of an object captured as the above-mentioned difference is observed.

First, observation images 92 of the first vehicle door 71 periodically acquired are successively compared with the reference image 91, the outer frame of each acquired difference (the difference image 94) is surrounded by a quadrilateral F, and a central coordinate C is obtained. The central coordinate of the first difference image 94 is referred to as "C1", and central coordinates of other difference images 94 are sequentially referred to as "C2", "C3", - - -, and "Cn". They are described as "C" when no distinguishing is required.

Next, the difference between the initially obtained central coordinate C1 of the difference image 94 and each of the following central coordinates C2, C3, - - -, and "Cn" is obtained. If the obtained difference exceeds a prescribed threshold, an object corresponding to the difference is recognized as a moving object (for example, a pedestrian or the like) that is not trapped by the vehicle door, and it is determined that "there is no trapping".

If the difference of the compared central coordinates C falls below the prescribed threshold, that is, when the movement of the central coordinate C is small, the object corresponding to the difference is recognized as an object staying near the door and trapped by the first vehicle door 71. That is, it is determined that "trapping is present".

Figure 7:
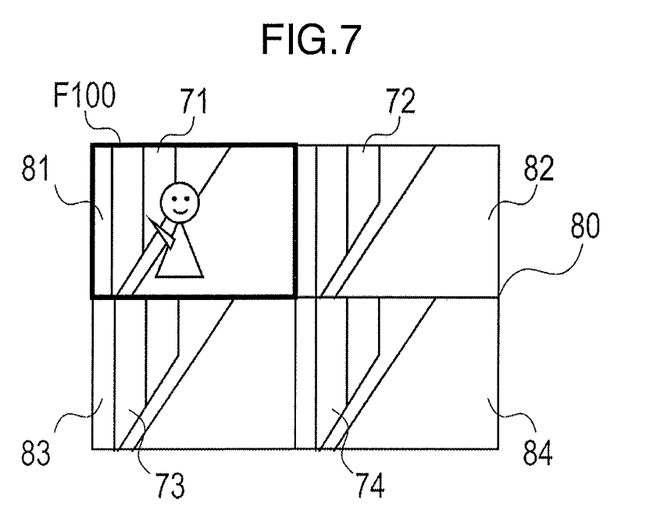
FIG. 7 is a diagram illustrating an exemplary display of monitoring videos in the case of determining that "trapping is present", according to an exemplary embodiment.

Next, processing to be performed when the trapping has been determined will be described. FIG. 7 is an exemplary display of the monitoring videos in the case of determining that "trapping is present". Normally, monitoring videos of respective vehicle doors (the first to fourth vehicle doors 71 to 74) are allocated and displayed on the monitor 80 from the time the vehicle doors (the first to fourth vehicle doors 71 to 74) are opened after the train stops at a station.

However, regarding the video from the monitoring camera of the door that has been determined as causing the above-mentioned trapping, the video is displayed in a highlighted mode that tends to draw attention, such as surrounding the displayed video by a red frame F100 or the like as illustrated in FIG. 7 (see section 81), or displaying brightly or blinking the frame. The degree of drawing attention may be enhanced as time elapses.

Further, in response to one or more occurrences of trapping, the server 50 causes the alarm device 53 to output alarm sounds. At this time, like the display mode, processing for increasing the alarm sounds as time elapses after the recognition time of trapping may be performed.

Figure 8:
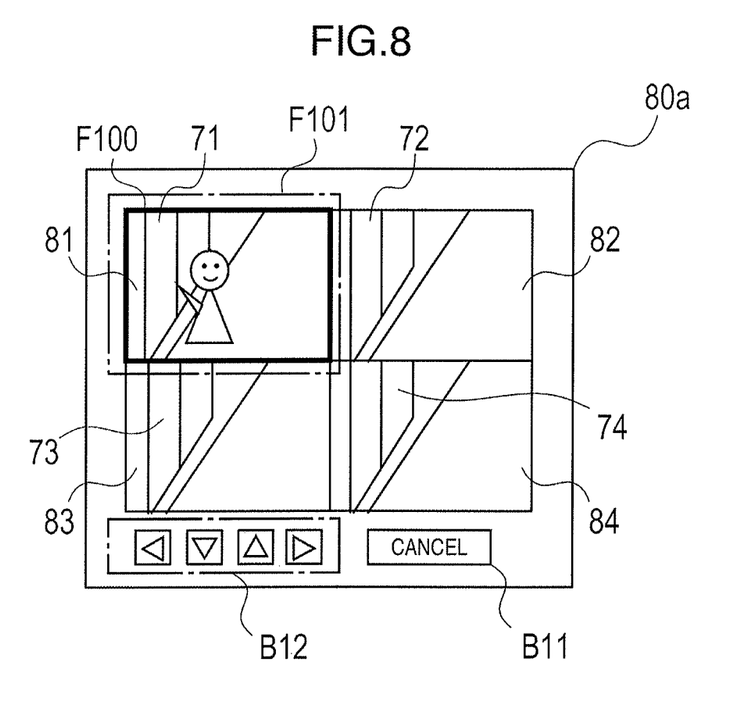
FIG. 8 is a diagram illustrating an exemplary display of the monitor in which performing a trapping determination cancellation operation is feasible, according to an exemplary embodiment.

Subsequently, trapping determination cancellation processing will be described. It is assumed that the crew member 98 determines whether to cancel the trapping while confirming the videos on the monitor 80. FIG. 8 illustrates an exemplary display of the monitor 80 in which performing a trapping determination cancellation operation is feasible. A cross input button B12 for touch operation (or operation from an external input interface or the like), a cancellation button B11, and the like are prepared in the lower part of the display area. The crew member 98 operates the cross input button B12 to select a video in which the trapping has been eliminated, and then depresses the cancellation button B11 for cancelling the trapping determination state.

A blue frame F101 is rendered for the currently selected video, and the rendering of the red frame F100 is deleted for the cancelled video. When monitoring videos of all the vehicle doors are brought into a state of no trapping, a train traveling start instruction (train departure permission) is awaited, and the display of all the monitoring videos on the monitor is terminated after starting traveling. In addition, when the number of trapping cases becomes 0, the ringing of alarm sounds is stopped.

Figure 9:
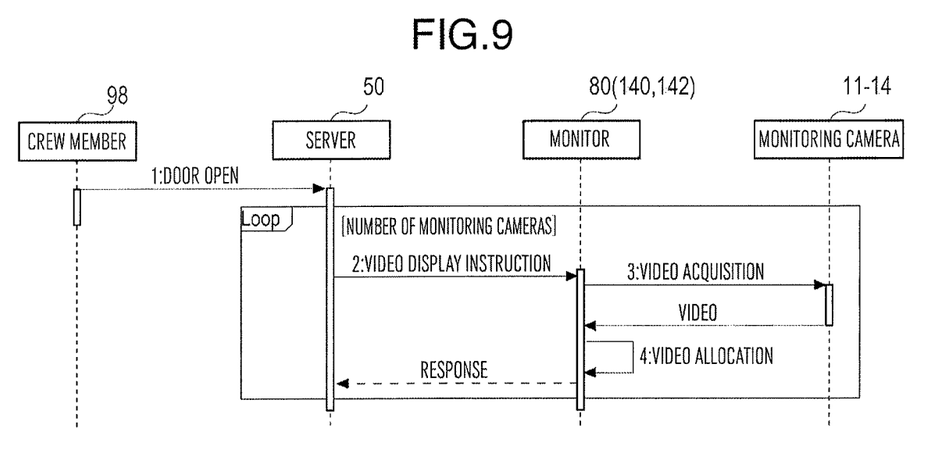
FIG. 9 is a sequence diagram illustrating processing to be performed until start of monitoring triggered by the opening of vehicle doors after the stop of a train in a station, according to an exemplary embodiment.
Figure 10:
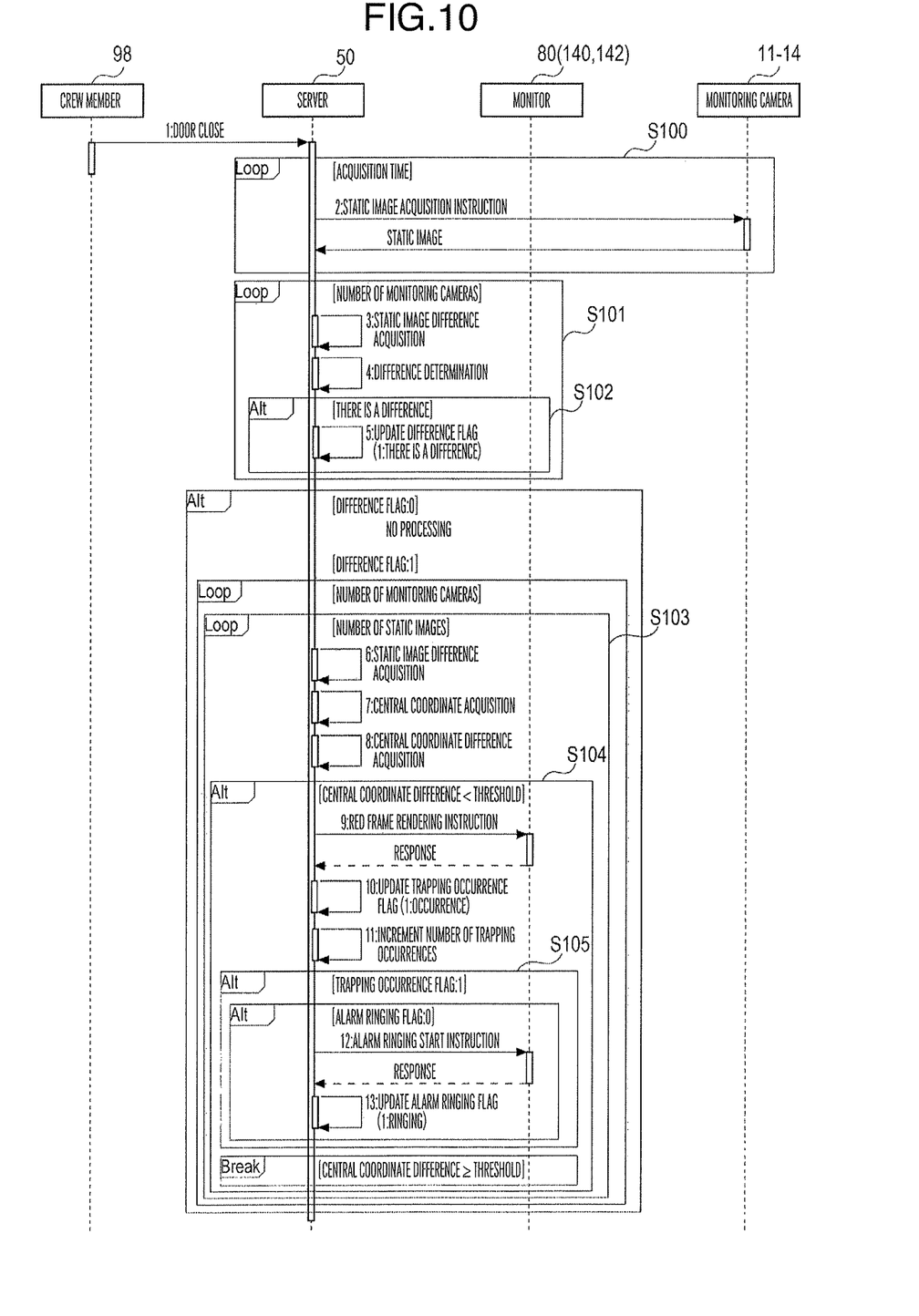
FIG. 10 is a sequence diagram including trapping determination processing to be performed when the vehicle doors are closed, according to an exemplary embodiment.
Figure 11:
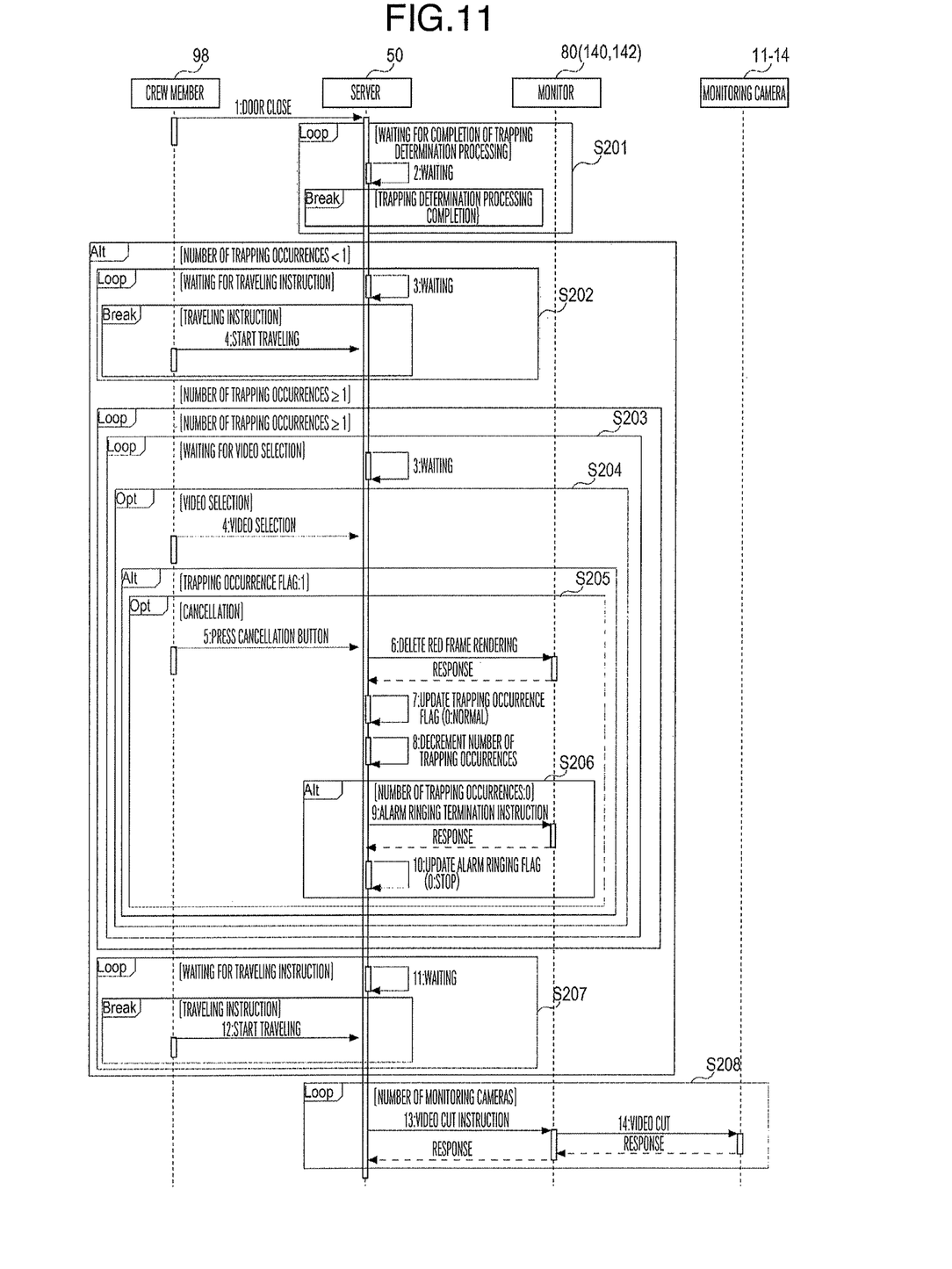
FIG. 11 is a sequence diagram of trapping determination cancellation processing, according to an exemplary embodiment.
Figure 12:
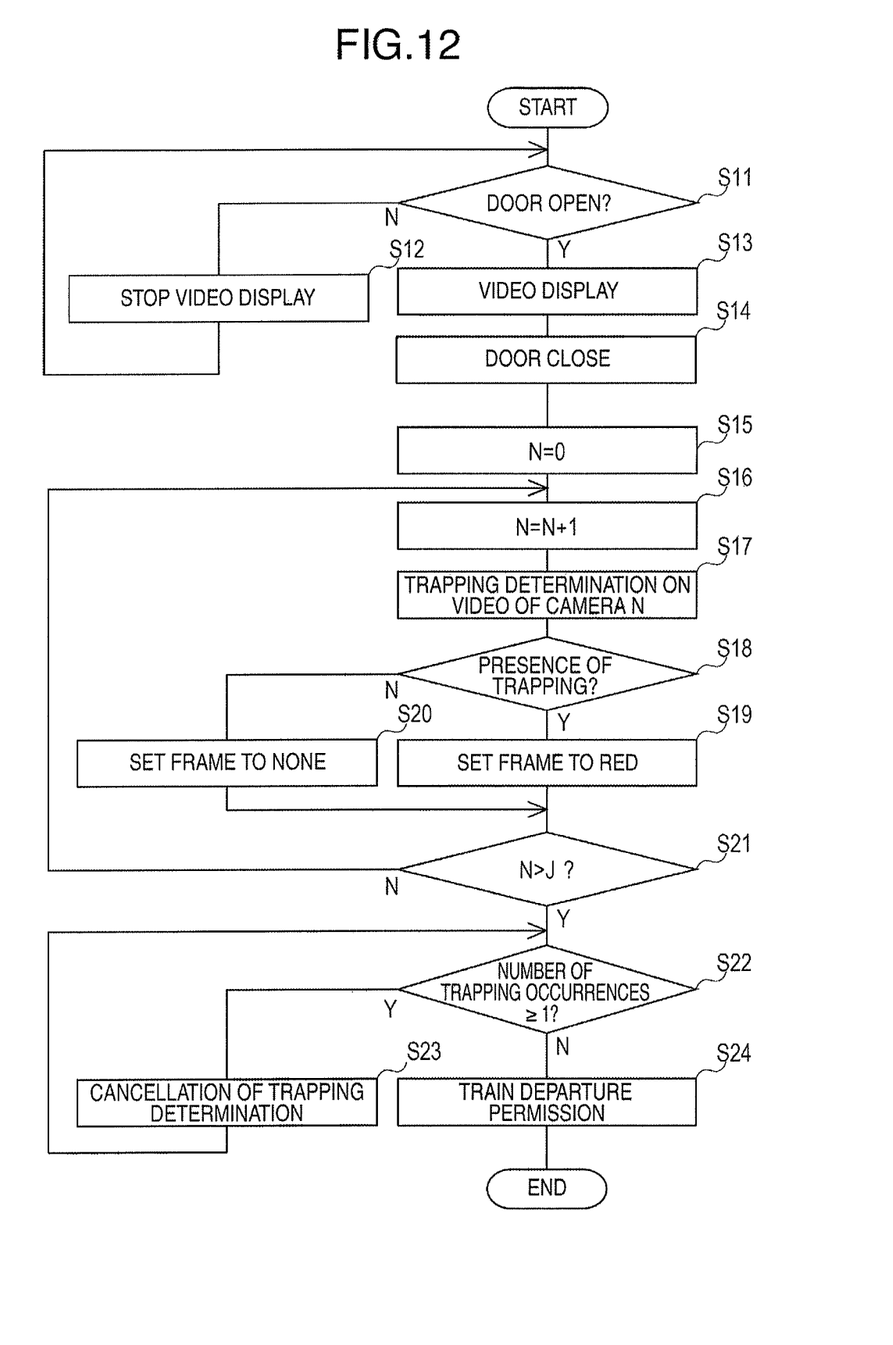
FIG. 12 is a flowchart illustrating the trapping determination processing, according to an exemplary embodiment.

FIG. 9 is a sequence diagram focusing on the crew member 98, the server 50, the monitor 80, and monitoring camera (the first to fourth monitoring cameras 11 to 14) with respect to processing to be performed until start of monitoring triggered by the opening of the vehicle doors after the stop of the train in the station. FIG. 10 is a sequence diagram when the vehicle doors are closed. FIG. 11 is a sequence diagram of the trapping determination cancellation processing. FIG. 12 is a flowchart illustrating the outline from station stop to departure by the monitoring camera system 100. The sequence of FIG. 9 corresponds to steps S11 to S13 of the flowchart illustrated in FIG. 12. The sequence of FIG. 10 corresponds to steps S14 to S22 of the flowchart illustrated in FIG. 12. The sequence of FIG. 11 corresponds to steps S22 and S23 of the flowchart illustrated in FIG. 12.

The server 50 monitors whether the train has stopped at the station and the doors are opened (step S11). When the doors are not opened (No in step S11), the server 50 brings the video display into a stop state (step S12), and continues the monitoring of a train stopped (step S11). If it is detected that the train has stopped at the station and the vehicle doors (the first to fourth vehicle doors 71 to 74) are opened (Yes in step S11), the server 50 starts processing for sequentially allocating and displaying monitoring videos of the first to fourth monitoring cameras 11 to 14 on the monitor 80 installed in a crew room or the like (step S13).

Next, if the vehicle doors (the first to fourth vehicle doors 71 to 74) have been closed by the operation of the crew member 98 or the like (step S14), the server 50 performs trapping determination (step S15 and the following steps).

First, the server 50 initializes a variable N indicating ID of each monitoring camera (each of the first to fourth monitoring cameras 11 to 14), namely N=0 (step S15). Subsequently, the server 50 increments the variable N (step S16), and performs the trapping determination processing described with reference to FIG. 6 based on the video of the camera N (corresponding to each of the first monitoring camera 11 to the fourth monitoring camera 14 in the case of N=1 to 4) (step S17).

If there is trapping (Yes in step S18), the server 50 sets the frame for displaying this video to red (step S19). If there is no trapping (No in step S18), the server 50 sets the frame to none (step S20).

Subsequently, the server 50 determines whether the trapping determination has been completed for all the monitoring cameras (the first to fourth monitoring cameras 11 to 14) by checking whether the variable N exceeds a prescribed number (J) (step S21). If there is any trapping determination remaining (No in step S21), the processing returns to step S16.

Hereinafter, a specific procedure of the trapping determination will be described with reference to the sequence of FIG. 10. As illustrated in the sequence of FIG. 10, when the acquisition corresponding to the acquisition time is completed (step S100), next, difference comparison is performed between the reference image 91 stored in the server 50 in advance as the static image of each monitoring camera in the normal state where nothing is trapped by the vehicle door and the static image (the observation image 92) initially acquired in the above-mentioned acquisition time (step S101).

At this time, a flag indicating the existence of difference is set only for the monitoring camera from which the difference has been found (step S102). Next, the trapping determination processing is performed on the monitoring video of the monitoring camera from which the difference has been found (step S103).

If the difference is found, difference determination processing is performed with respect to the central coordinate C (step S103). That is, in this case, the difference is acquired between the acquired static image (the observation image 92) and the reference image 91. Next, the quadrilateral F is rendered so as to surround four sides of an object having caused the difference, and the center point thereof is obtained and set as the central coordinate C.

The server 50 compares the central coordinate C with a value determined in advance as a threshold. If the central coordinate C falls below the threshold, the server 50 determines that trapping has occurred as processing in step S104, instructs the monitor 80 to draw the red frame for the corresponding video, sets a trapping occurrence flag for the monitoring camera that captures the corresponding video, and increments the entire number of occurrences of trapping.

When the trapping occurs, alarm ringing processing is performed (step S105). If an alarm ringing flag is not set when incrementing the number of occurrences of trapping, starting the alarm ringing is instructed and the alarm ringing flag is incremented.

Regarding differences between static images, the threshold check is not performed for the number of static images. When the difference exceeds the threshold, the processing shifts to the threshold check of static images of the next monitoring camera at that time. The above-mentioned processing is performed until the threshold check completes for static images of all the monitoring cameras.

Referring back to the description of FIG. 12, if the trapping determination terminates entirely (Yes in step S21), it is determined whether the number of occurrences of trapping is one or more (step S22).

If there are one or more occurrences of trapping (Yes in step S22), the server 50 determines whether the trapping determination has been cancelled by the operation of the cancellation button B11, for example, like the exemplary display of the monitor 80 illustrated in FIG. 8 (step S23). When trapping determination is cancelled by the operation of the cancellation button B11, the server 50 determines again whether the number of occurrences of trapping is one or more (step S22).

If the server 50 determines that the number of occurrences of trapping has become 0, that is, if it is determined that the trapping state has been eliminated (No in step S22), the state of train departure permission is set (step S24). After this, the train starts traveling according to an operation of the crew member 98. However, the display of videos of the first to fourth monitoring cameras 11 to 14 on the monitor 80 is continued under a prescribed condition, for example, until the train speed becomes equal to or higher than a prescribed speed (for example, 3 km/h or more). In addition, if trapping is detected during the trapping determination processing continued after the train starts traveling, the server 50 can instruct the emergency stop device 55 to stop the train.

Hereinafter, a specific procedure of the trapping determination cancellation processing will be described with reference to FIG. 11. As described with reference to FIG. 8 and the like, the cancellation of the trapping determination is performed based on confirmation by the crew member 98.

First, when the server 50 receives a notification that the vehicle doors have been closed, the crew member 98 waits for completion of the trapping determination processing (step S201). After the completion, if the number of occurrences of trapping is zero, a traveling instruction by the crew member is just awaited. When the traveling is started, all the video display on the monitor 80 is terminated (step S202).

If the number of occurrences of trapping is one of more, termination of the confirmation work by the crew member 98 is awaited (step S203). The crew member performs the confirmation work for all the vehicle doors where trapping has occurred, and if it is determined that there is no problem, selects the video thereof and depresses the cancellation button (step S204).

When the cancellation button is pressed, the server 50 instructs the monitor 80 to delete the red frame rendering of the corresponding video, delete the trapping occurrence flag of the monitoring camera that captures the corresponding video, and decrement the number of occurrences of trapping (step S205). If the number of occurrences of trapping is still one or more, the above-mentioned processing is repeated until the number of occurrences of trapping becomes 0.

Further, when the number of occurrences of trapping becomes 0 at the time of decrementing the number of occurrences of trapping, processing for instructing to stop the alarm ringing and deleting the alarm ringing flag is performed (step S206), and the traveling instruction by the crew member is awaited (step S207). When the traveling is started, all the video display on the monitor 80 is terminated (step S208).

As described above, according to the present embodiment, the following effects can be obtained. (1) The monitoring camera system 100 can be improved in availability and reliability by using the image processing determination of monitoring videos, in place of or in combination with physical sensors, in the trapping detection of respective vehicle doors (the first to fourth vehicle doors 71 to 74). (2) The monitoring camera system 100 can be improved in convenience by automatically allocating monitoring videos of respective vehicle doors (the first to fourth vehicle doors 71 to 74) to the monitor 80 in such a way as to enable the crew member 98 to confirm the situation of respective vehicle doors (the first to fourth vehicle doors 71 to 74) while viewing the videos. (3) When trapping is detected while the monitoring videos of respective vehicle doors (the first to fourth vehicle doors 71 to 74) are allocated to the monitor 80, displaying the corresponding video on the monitor 80 in a display mode that draws attention easily and causing the alarm device 53 to ring alarm sounds can call the attention of the crew member 98 and can improve work efficiency, monitoring easiness, and reliability.

The present invention has been described based on some embodiments. However, these embodiments are mere examples, and it will be readily understood by those skilled in the art that various modification can be made to combinations of respective constituent elements and such modifications are encompassed in the present invention.

For example, the following functions may be added or changed in line with the processing in the above-mentioned embodiments. (1) In the case of attaching a vibration measurement device to the monitoring camera system 100, if the train starts traveling while trapping something, it can be assumed that vibrations occur excessively compared to the normal start of traveling. The detection accuracy can be improved by using the vibration information in combination with the trapping detection. (2) In the case of attaching a noise measurement device to the monitoring camera system 100, if the train starts traveling while trapping something, it can be assumed that noises are generated excessively compared to the normal start of traveling. The detection accuracy can be improved by using the noise information in combination with the trapping detection. (3) After the first to fourth vehicle doors 71 to 74 have been opened, although the video display is continuously performed through the processes of the situation confirmation work by the crew member 98→deleting the red frame by the deletion button after confirmation→becoming 0 in the number of occurrences of trapping, another processing, such as "terminating the display of the selected video itself by depressing the deletion button" or "enabling the crew member to start traveling when all the video display terminates", may be performed. Deleting the selected video and terminating the display thereof can improve the operability since remaining videos can be displayed compactly.

REFERENCE SIGNS LIST

1 to 4: first to fourth vehicle
11 to 14, 11*a* to 14*a*, 11*b* to 14*b*: first to fourth monitoring cameras
40: vehicle
50: server
51: recording device
52: host server
53: alarm device
55: emergency stop device
71 to 74: first to fourth vehicle doors
80: monitor
98: crew member
99: platform
100: monitoring camera system
140, 142: monitor PC
144 to 147: L2-SW

The invention claimed is:

1. A monitoring system including a monitoring camera that images a door of a train, a control device that detects trapping by the door based on a video obtained by the monitoring camera, and a monitor that displays the video of the monitoring camera, wherein
when the door has changed from an opened state to a closed state, the control device determines a trapping determination state that trapping by the door has occurred based on a difference image between a reference image captured by the monitoring camera and an observation image captured by the monitoring camera after elapse of a prescribed time since the capturing of the reference image, the monitor displays, in a highlighted mode, the video of the monitoring camera that captures the door determined as causing the occurring of the trapping and further displays a cancellation button for cancelling the trapping determination state, and if the cancellation button is pressed, the highlighted mode of the video of the monitoring camera is cancelled.

2. The monitoring system according to claim 1, wherein the monitoring camera captures a plurality of the observation images after capturing the reference image, and the control device acquires a difference image between the reference image and each observation image, obtains the movement of a central coordinate from central coordinates of the plurality of difference images, and determines that trapping by the door has occurred if it is determined that the central coordinate has not moved.

3. A monitoring method for detecting trapping by a door of a train, based on a video of a monitoring camera that images the door of the train, comprising:

a difference calculation step of calculating a difference between a reference image captured by the monitoring camera and an observation image captured by the monitoring camera after elapse of a prescribed time since the capturing of the reference image, when the door has changed from an opened state to a closed state;

a trapping determination step of obtaining the movement of a central coordinate of the difference, and determining trapping determination state that trapping by the door has occurred if it is determined that the central coordinate has not moved;

an alarm ringing step of starting an alarm ringing if the trapping determination state that the trapping has occurred is determined in the trapping determination step;

a cancelling step of receiving an operation of a cancellation button for cancelling the trapping determination state; and a stoning step of stooping the alarm ringing.

* * * * *